Oct. 7, 1952 P. M. LEWIS 2,612,962
HELICOPTER ROTOR CONSTRUCTION
Filed Sept. 9, 1947 4 Sheets-Sheet 2

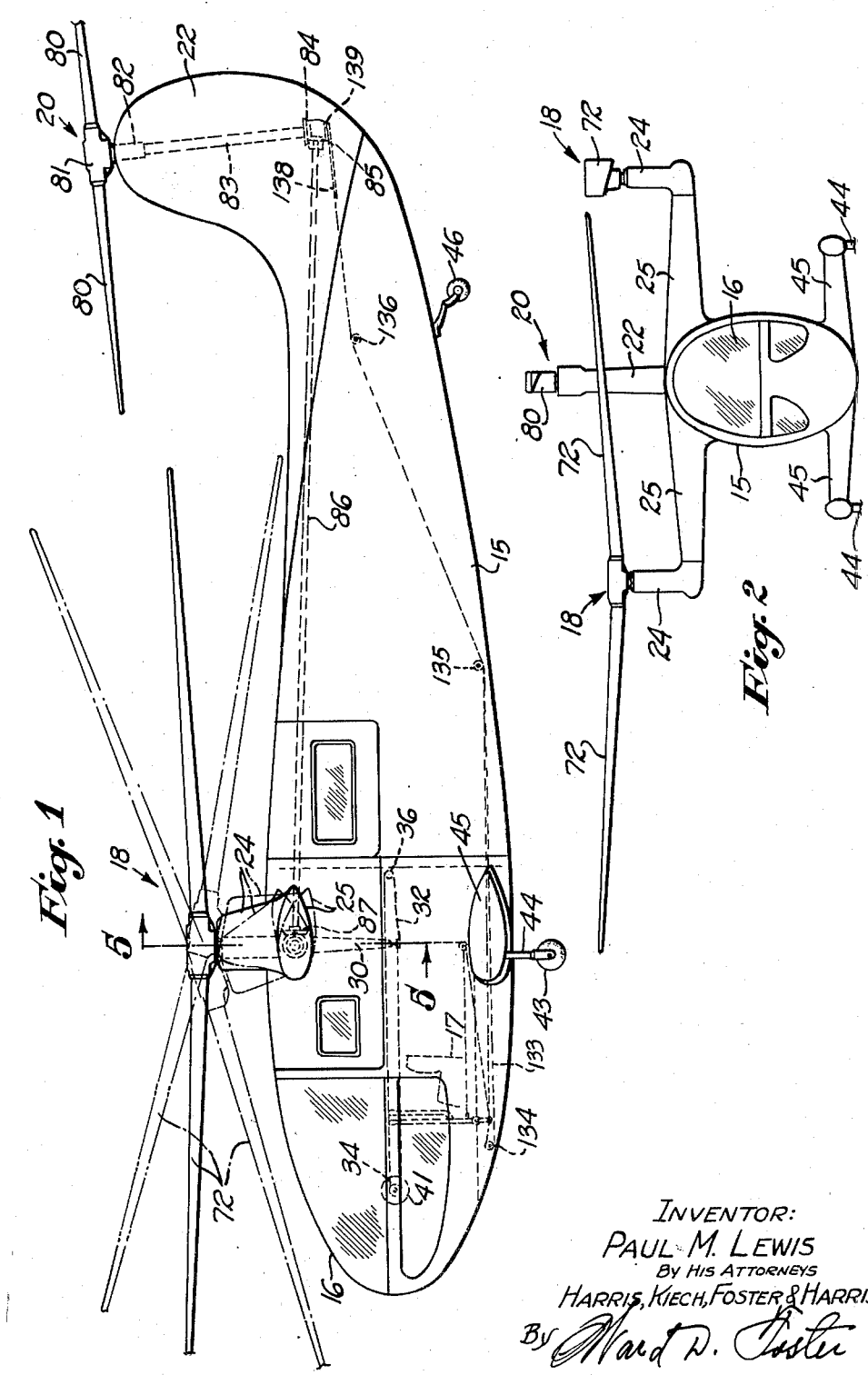

INVENTOR:
PAUL M. LEWIS
BY HIS ATTORNEYS
HARRIS, KIECH, FOSTER & HARRIS

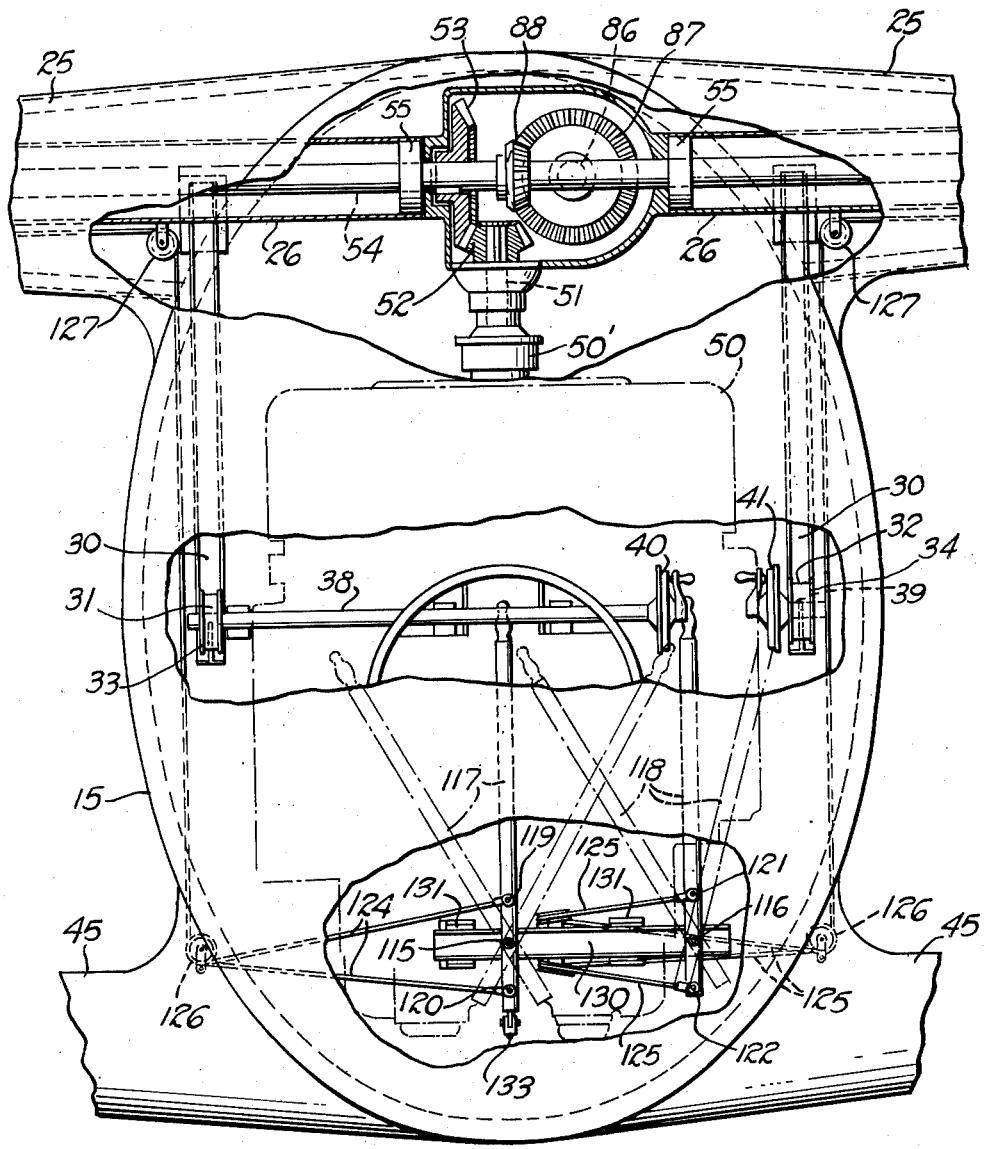

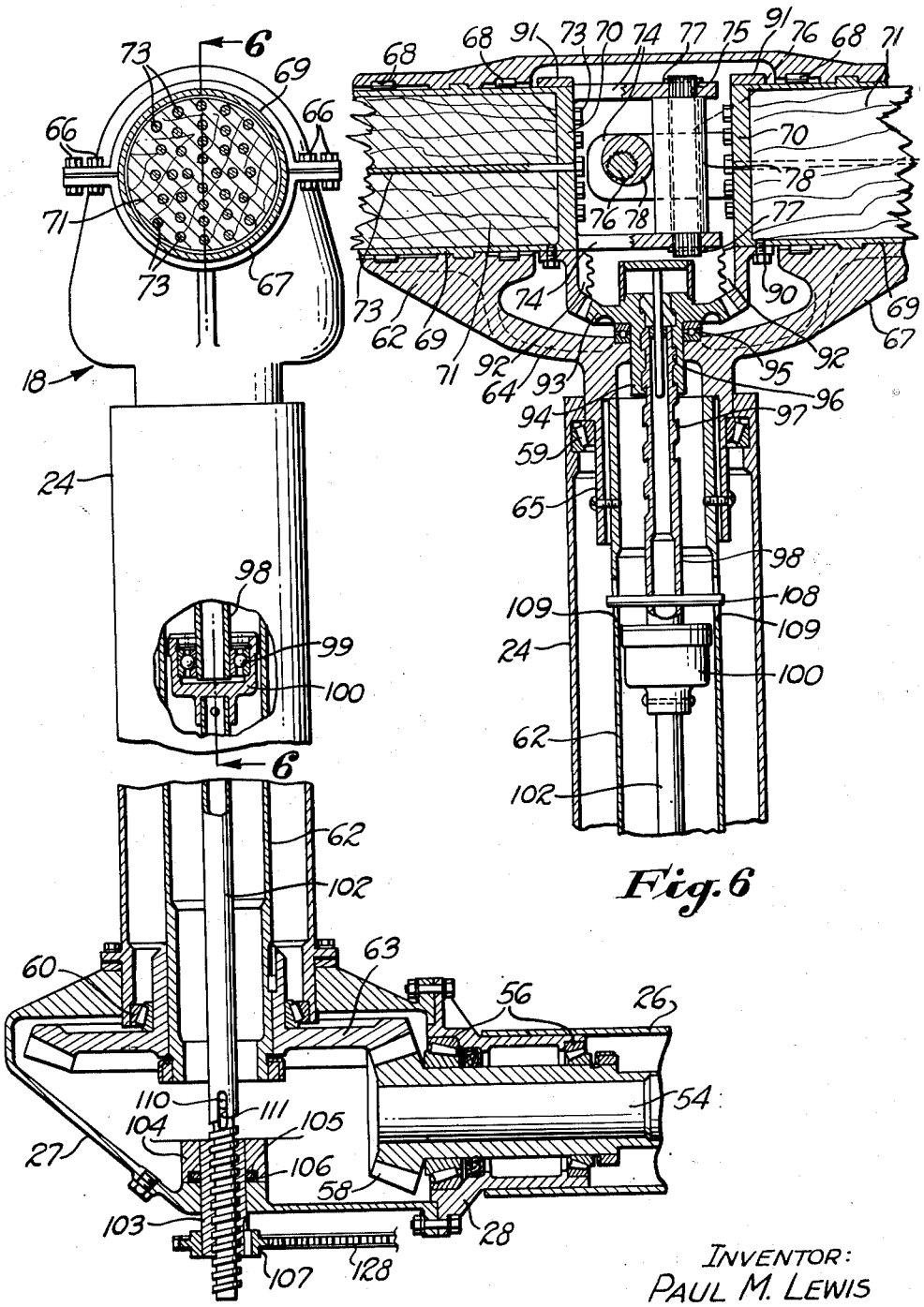

Patented Oct. 7, 1952

2,612,962

UNITED STATES PATENT OFFICE 2,612,962

HELICOPTER ROTOR CONSTRUCTION

Paul M. Lewis, Chicago, Ill., assignor to Peninsular Metal Products Corporation, Detroit, Mich., a corporation of Michigan Application September 9, 1947, Serial No. 772,953

7 Claims. (Cl. 170—160.42)

This invention relates to aeronautical apparatus.

An object of the invention is to provide in an aircraft of the helicopter type means for simultaneously varying the pitch of the individual blades of each rotor and including means for adjustably interconnecting the blades for unitary rotation about the axis of the rotor while permitting relative rotation on their respective axes to vary their pitch, said interconnecting means also serving to resist centrifugal force exerted upon the blades.

Other objects and features of the invention will be apparent to those skilled in the art to which this invention pertains, as will become evident upon reference to the accompanying drawings wherein certain embodiments of the invention are disclosed merely for the purpose of illustration. In the drawings:

Fig. 1 is a side elevational view of a helicopter constructed in accordance with the present invention;

Fig. 2 is a front elevation of the structure shown in Fig. 1;

Fig. 4 is an enlarged front elevation of the nose of the helicopter with parts of the nose broken away to disclose the internal parts;

Fig. 5 is a further enlarged cross-sectional view of the driving means for one of the power rotors, taken on line 5—5 of Fig. 1; and Fig. 6 is a cross-sectional view taken on line 6—6 of Fig. 5.

Figure 3:
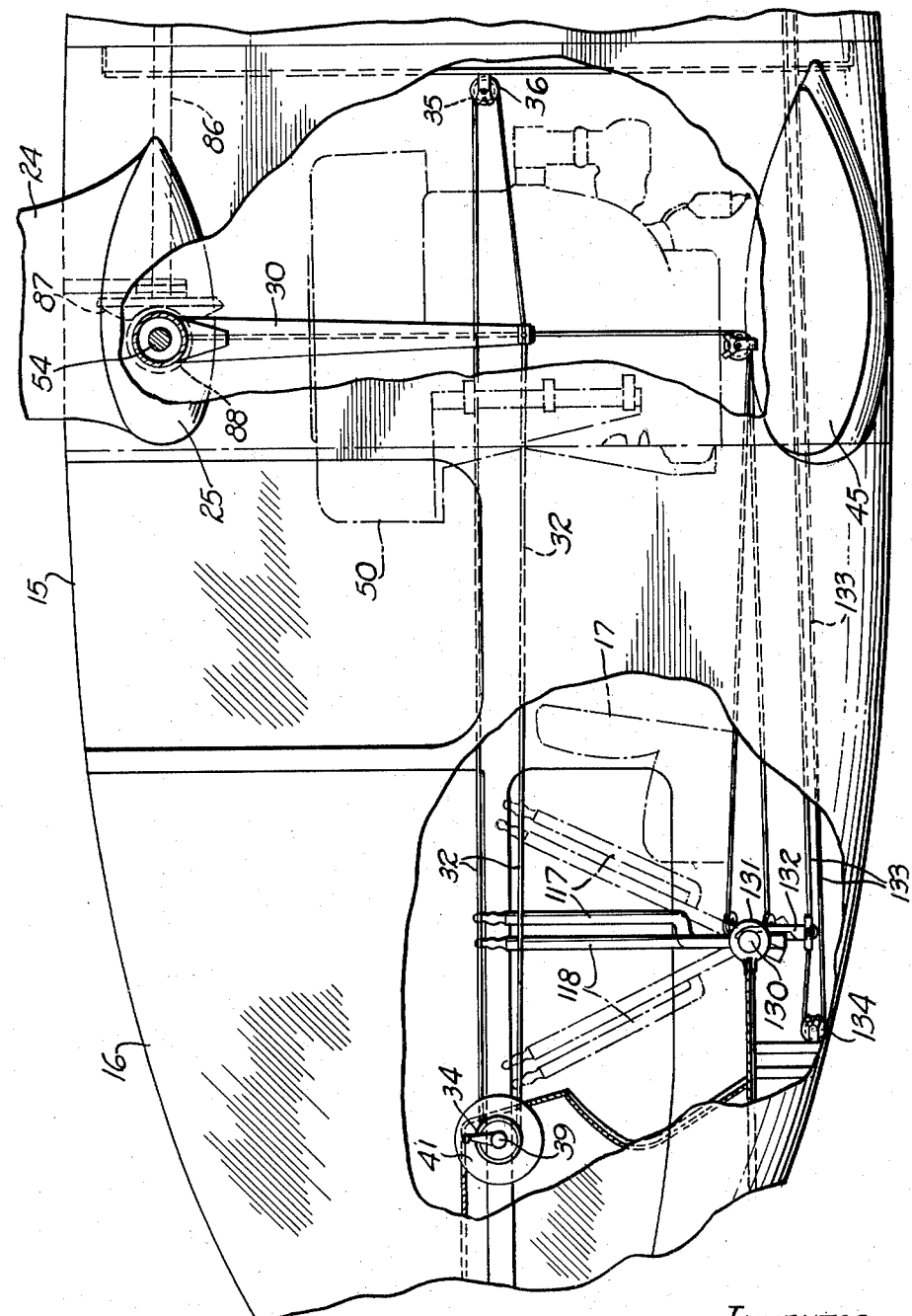
Fig. 3 is an enlarged fragmentary view of the nose end of the helicopter showing the manually operable controls.

In the form of helicopter construction shown in the drawings, a fuselage 15 of conventional construction is shown as being provided at its forward portion with a suitable removable transparent hood 16 normally enclosing a cockpit in which a seat 17 for a pilot and passengers is provided adjacent to appropriate control mechanism hereinafter described.

Arranged laterally of the forward portion of the fuselage 15 are two power rotors 18 disposed in generally horizontal positions on generally vertical axes, and at the rear of the fuselage is disposed a single, preferably relatively small stabilizing rotor 20 mounted in a special tailpiece 22 of the fuselage 15.

The two rotors 18 are carried, respectively, in vertically extending narrow housings 24 which enclose means constituting the axes about which the rotors 18 operate. The housings 24 are rotatably carried upon transversely extending cantilever beams 25 of streamlined outline resembling airfoils which are rigidly secured to the upper portion of the fuselage 15. Obviously, any suitable additional bracing means (not shown) may be employed if necessary or desirable. The housings 24 are adapted to be rotated about an axis extending centrally of the hollow beams 25, such motion being transmitted to the housings by sleeves 26, the outer ends of which are rigidly connected to the lower ends of the housings by box-like casings 27 and coupling members 28. The sleeves 26 are mounted for rotation within the beams 25 by means of suitable bearings and secured to each sleeve is a depending arm 30 (Fig. 3). A pair of endless control cables 31 and 32 pass around forward and aft pulleys 33, 34 and 35, 36, respectively, arranged within the cockpit 16 at the sides thereof. The forward pulleys 33 and 34 are carried by shafts 38 and 39, respectively, extending transversely of the cockpit and suitably journaled in bearings therein, (Fig. 4). Handwheels 40 and 41 are fixed to the shafts 38 and 39 and are located in a position to be readily rotated by the pilot. The cables 31 and 32 are joined to the lower ends of the arms 30 so that when the handwheels are rotated manually the sleeves 26 will be turned to cause the rotor housings 24, together with the rotors 18, to be tilted forwardly or rearwardly, depending upon the direction of rotation of the handwheels. By providing separate control means for each rotor tilting mechanism, as above described, the right- and left-hand rotors may be tilted independently of each other, and in opposite directions if desired, in maneuvering the helicopter. The axis of the rear rotor 20 is permanently tilted forwardly as shown in Fig. 1 to improve its stabilization effect and at the same time permits a limited amount of propulsive effort.

The helicopter is adapted to rest upon and move along the ground, as when taxiing, and a pair of ground wheels 43 are provided for this purpose. The wheels 43 are rotatable at the lower ends of struts 44 depending from spars 45 which project laterally from the fuselage adjacent the bottom thereof, the spars being preferably of airflow cross-section as shown in Fig. 1. The rearward end or tail of the craft may be similarly supported by a tail-wheel 46 or suitable skid means.

As shown in Figs. 3 and 4, the power means for rotating the rotors 18 consists of an internal combustion engine 50 located within the fuselage 15 of the helicopter and may be of any suitable type. Suffice it to state that the engine 50 has a vertical output or drive shaft 51, to the upper end of which is keyed a bevel gear 52. A clutch, such as indicated generally at 50', may be included in the drive shaft 51. The bevel gear 52 meshes with a larger bevel gear 53 keyed to a shaft 54 extending transversely of the fuselage 15 within the sleeves 26 and rotatable in bearings 55 and 56 therein, the bearings 56 being of the combined axial and radial thrust roller type. The transverse shaft 54 carries a bevel gear 58 at each of its ends for driving the individual rotors 18. Since the rotors 18 are of identical construction, only one is herein shown and described in detail.

Referring to Figs. 5 and 6, each tubular rotor housing 24 has its lower end secured within a vertical opening in the casing 27 and carries roller bearings 59 and 60 within its upper and lower ends, respectively, for rotatably supporting a tubular sleeve or torque tube 62. A relatively large bevel gear 63 is keyed to the lower end of the sleeve 62 and the hub of this gear is rotatable in the bearing 60. Rigidly secured to the upper end of the sleeve 62 is a hollow hub member 64 which has a tubular extension 65 rotatable in the upper bearing 59, the extension 65 being suitably connected to the upper end of the hollow shaft 62. It will be apparent from the above that during operation of the engine 50 the transverse shaft 54 is rotated through the medium of the gears 52 and 53 and the shaft 54, in turn, drives the vertical tubes 62 and hub members 64 by means of the meshing gears 58 and 63. Through this arrangement of parts the rotor tubes 62 and hub members 64 at opposite sides of the fuselage 15 are rotated in opposite directions. A suitable clutch (not shown) may be provided for connecting and disconnecting the drive from the engine 50 to the shaft 54.

Each hub member 64 is split horizontally to provide two mating parts which are secured together by means of bolts 66 (Fig. 5). Each hub member 64 is also provided with a pair of opposite radial tubular bosses 67 in which are antifriction bearings 68 for rotatably supporting sleeves 69 which have inner closed ends 70. Held in the sleeves 69 are the inner circular spindles 71 of power rotor blades 72, a plurality of screws 73 passing through holes in the spindles 70 of the sleeves 69 and screwed into threaded holes in the spindles 71 of the blades 72 serving to rigidly connect these parts for unitary turning movement in the bosses 67 in the manner and for the purpose to be later explained. It will be observed by reference to Fig. 2 that the blades 72 of each rotor 18 are inclined upwardly from their axis of revolution to effect a dihedral which acts to stabilize the craft. The rotor blades 72 may be of a suitable airfoil contour in cross section as usually provided in conventional helicopters, the present invention not being limited to any specific form of blades.

During the relatively fast revolution of the rotor blades 72 about the axis of the rotor 18 the blades are subjected to considerable centrifugal force tending to move them radially outward in the direction of their longitudinal axes and to prevent such movement and to relieve the strain on the blades, this invention provides means for interconnecting the blades in such a manner that the centrifugal force exerted upon each blade is counteracted by the similar force exerted upon the other blade so that these forces are, in effect, balanced out or nullified. Referring to Fig. 6, the inner end of each sleeve 69 is provided with a pair of diametrically spaced arms 74, the pairs of arms of each sleeve being set at substantially right angles to the pairs of arms of the other sleeve. Adjacent their free ends, the pairs of arms 74 of each sleeve 69 have aligned, broached holes 75 having serrations for receiving the ends of a fluted pin 76 which are held in place therein by snap-rings 77. Each fluted pin 76 passes through the fluted bore of an eccentric 78 which is interposed between the arms 74. It will be observed by reference to Fig. 6 that the two eccentrics 78 engage and interlock, one with the other, so that centrifugal force acting upon each rotor blade 72, when the rotor 18 is rotating, will be counteracted by centrifugal force imposed upon the other blade in the opposite direction. Through this arrangement of parts the radial thrust exerted upon the rotor blades in a direction away from their common axis of revolution is absorbed by the eccentric 78, pins 76 and arms 74 and thus strain on the bearings 68 and other parts is entirely avoided. In order to adjust and maintain the eccentrics 78 in interengaging relationship, one or both fluted pins 76 may be withdrawn from its respective bearings in the arms 74 and one of the eccentrics turned with respect to the other eccentric, after which the pin is re-inserted and secured in the holes 75 to maintain the adjustment. The eccentric interconnecting means serves a second function, in that it permits adjustment of the rotor blade sleeves 69 toward and away from each other, to establish proper cooperation between the operating parts of the blade adjusting mechanism, to be described hereinafter.

The rear stabilizing rotor 20 is similar in construction to the power rotors 18, previously described, and therefore will not be described in detail. Suffice it to explain that the rotor 20 is provided with a pair of blades 80 which are connected to and rotated by a central rotor hub member 81 suitably journaled to rotate in a bearing sleeve 82 located in the tail portion 22 of the fuselage 15. The driving means for the rotor 20 includes a shaft 83 having a bevel gear 84 which meshes with a similar gear 85 on the rearward end of a drive shaft 86 extending longitudinally within the fuselage 15. The forward end of the shaft 86 carries a bevel gear 87 which meshes with a smaller bevel gear 88 fast on the transverse shaft 54. It will be apparent that when the transverse shaft 54 is rotated the rotor 20 is driven thereby through the medium of the gears and shafts above described at a reduced rate of speed. The axis of the shaft 83 and hub member 81 is inclined forwardly with respect to the vertical or to the longitudinal axis of the fuselage 15 and this serves to stabilize the fuselage and at the same time adds to the propelling power.

It has been stated that the rotor blades 72 are adapted to be turned on their longitudinal axes to vary their pitch and this is accomplished by means to be next described. Surrounding the inner end of each rotor sleeve 69 and secured thereto by screws 90 is a ring 91 formed with a segmental bevel gear 92, the teeth of which mesh with the teeth of a bevel gear 93 arranged between the two gears 92 and rotatable on a substantially vertical axis. As shown in Fig. 6, the gear 93 is provided with an elongated hub 94 which is rotatable in a ball bearing 95 on the rotor hub member 64. The hub 94 of the gear 93 is provided with a screw-threaded bore 96 which is adapted to receive the upper screw-threaded end 97 of a tubular spindle 98. As shown in Fig. 5, the lower end of the spindle 98 is rotatable in a ball bearing 99 held in a cup-shaped connector element 100 which, in turn, is fastened to the upper end of a tubular actuating shaft 102. The shaft 102 is arranged coaxial with the spindle 98 and is provided with external screw threads at its lower end which engage with the internal screw threads of a cylindrical nut member 103 rotatable in a boss 104 of the casing 27. The nut member 103 is retained in the boss 104 and held against axial displacement by reason of a peripheral flange 105 on the member engaging an annular recess 106 in the boss. To the lower end of the nut member 103 is secured a sprocket 107 which is adapted to be manually rotated by the pilot through means later described to adjust the pitch of the rotor blades 72. Any suitable means may be provided for preventing relative rotation between the spindle 98 and the tubular shaft 62, Fig. 6 illustrating this means as comprising a transverse pin 108 held in and arranged with its ends projecting radially outward from the spindle 98 and through elongated slots 109 in the shaft 62. It will be apparent that through this construction, the spindle 98 may move axially within the tubular shaft 62 but is withheld against rotation relative to the shaft. When the spindle 98 is moved axially within the shaft 62 its screw threads 97, due to their engagement with the screw threads 96 of the gear 93, act to rotate the gear 93, the direction of rotation of the gear depending upon the direction of axial movement of the spindle. Rotation of the bevel gear 93 is transmitted to the gear segments 92 and the sleeves 69 are turned in the bearings 68. The rotor blades 72 thus are angularly adjusted to control their pitch, it being noted that through the gear connection 93, 92 the blades are turned on their longitudinal axes in opposite directions which is the necessary result. The shaft 102 is similarly held against rotation by a pin-and-slot connection 110, 111 so that when the nut member 103 is rotated the shaft 102 is moved vertically only. The two-piece construction 102, 98 is necessary to permit the spindle 98 to rotate with the gear 93, hub member 67 and tubular drive shaft 62 during operation of the rotor 18. As previously explained, the two power rotors 18 are of similar construction, the driving and adjusting parts described above in connection with one rotor being duplicated in the other power rotor.

The rotor-blade pitch adjusting mechanism described above is controlled manually by the pilot within the cockpit 16 through means to be next described. Mounted to pivot on spaced pins 115 and 116 having their axes extending parallel to the longitudinal axis of the fuselage are control levers 117 and 118. Attached to the respective levers 177 and 118 by pins 119, 120 and 121, 122 are the opposite ends of cables 124 and 125. Each of the cables 124 and 125 extends around pulleys 126 and 127 and its outer looped end is provided with a section of chain 128 (Fig. 5) which passes around the sprocket 107. It will be apparent from the above that when the control levers 117 and 118 are tilted on their respective pivots 115 and 116, in the manner indicated by dot-and-dash lines in Fig. 4, the chain sections 128 act to rotate the sprockets 107 to turn the nut members 103 to adjust the pitch of the power rotor blades 72 through the means before described.

The pivot pins 115 and 116 are carried by a transverse shaft 130 which is rotatable in bearings 131 and which is provided with a depending arm 132. An endless cable 133 is looped around a forward pulley 134 and passes over pulleys 135 and 136 (Fig. 1) and its rearward end is provided with a chain section 138 which is looped around a sprocket 139 which corresponds with the sprockets 107 described in connection with the power rotors 18. The sprocket 139 forms part of the pitch adjusting mechanism for the stabilizing rotor blades 80 and since this mechanism may be identical with the pitch adjusting mechanism for the power rotor blades, it is not herein shown or described in detail.

Operation

In operating a helicopter constructed according to the improvements of the present invention, the engine 50 is started in any desired manner, the clutch 50' (Fig. 4) having been first disengaged by any suitable means, not shown. After the engine 50 has been properly warmed, the clutch 50' is again engaged. The pitch of the blades 72 will have been adjusted to a suitable position, the axes of the rotors 18 will have been disposed in vertical position, and the blades 80 of the rear rotor 20 will have been adjusted about their longitudinal axes for proper stabilization of the ship during ascent.

Ascent to a proper height having been effected, forward motion is best accomplished by tipping the axes of the rotors 18 forward, whereby to obtain a proper angle of attack by the blades 72. This is accomplished by tipping the housings 24 so that their upper ends move forward, the motion being accomplished by rotating the sleeves 26 to which the housings 24 are secured through the medium of the arms 30, cables 31, 32 and hand wheels 40, 41 which are located adjacent the pilot's position in the cockpit 16. When the blades 72 of the rotors 18 are properly adjusted about their longitudinal axes for forward flight, the tipping of the rotors 18 bodily forward causes the blades which are moving forward in the common or overlapping portion of the paths of the rotors to move in a substantially horizontal plane. The same adjustment causes the blades to assume a steeper position as they rotate into the outermost portions of their paths, as a result of which the greater angle of attack produces greater propelling action. In other words, the flattened blades passing through the common portion of the paths of the rotors tend to slip forward through the air, whereas the blades moving rearward in the outermost portions of their paths attack the air positively at a steep angle to obtain maximum propelling effect. By reason of the inter-connection of the rear rotor 20 by means of the shaft 86 and its connection with the bevel gear 88, proper stabilization of the tail of the ship is obtained. The permanent tipping forward of the axes of the rotor 20, as indicated in Fig. 1, improves its stabilization effect and at the same time permits at least a limited amount of propulsive work.

Maneuverability of the ship is readily effected by adjustment of the various blades 72 of the power rotors 18 and the blades 80 of the stabilizing rotor 20 about their longitudinal axes. For example, a turn to the right may be accomplished when the axes of the rotors 18 are tipped forward in propelling position by leaving the blades of the left rotor in driving position and rotating the blades of the right rotor about their longitudinal axes so as to reduce the driving effect of the right rotor 18. Such adjustment of the various blades of the right hand rotor 18 about their longitudinal axes is accomplished by manipulation of the right hand control handle 117. Tilting of the handle 117 about its pivot pin 115 acts through the cable 124 to rotate the sprocket 107 and the nut member 103 to which the sprocket is secured. Rotation of the nut member 103 causes the screw shaft 102 and spindle 98 to feed upwardly and through the interengagement of the spiral thread connections 97, 96 the bevel gear 93 is turned through a part of a revolution to impart opposite rotary motion to the two gear segments 92. Thus the rotor blades 72, which are fast with the gear segments, are tilted in a direction to reduce their driving or propelling effect. The rotary joint 99, 100 is such as to permit free rotation of the spindle 98 upon the upper end of the screw shaft 102 while at the same time imparting vertical movement to the spindle corresponding with that of the screw shaft.

For the purpose of turning in the opposite direction, the pilot will tilt the handle 117 to restore the blades of the right rotor 18 to driving position; the blades of the left rotor 18 then being adjusted through the medium of the handle 118 to reduce their driving effort. Similarly, the ship may be trimmed by adjusting the blades 80 of the rear rotor 20 about their vertical axes by tilting the handles 117 and 118 forwardly and rearwardly.

For the purpose of vertical descent, the arms 30 of each rotor housing sleeve 26 are restored to an intermediate vertical position so that only lifting effects are obtained, thereby allowing the ship to settle. It is possible, in parking the ship, to move the same rearward, to some extent, by tipping the arms 30 in the opposite direction so as to tip the upper ends of the housings 24 and the upper end of the axes of the rotors 18 rearward, this also being accomplished by the pilot from the cockpit through the medium of the hand wheels 40 and 41 and the cables 31 and 32. After the ship has landed, the clutch 50 may be disengaged to disrupt the drive to the several rotors 18 and 20.

It will become apparent to those skilled in the art that many modifications may be made in the structure and arrangement of the various controls of the helicopter without departing from the spirit of the invention. Therefore, it is intended that all modifications shall be protected as fall within the scope of the appended claims.

I claim as my invention:

1. In a helicopter: a body having a longitudinal axis of flight; a rotor connected with said body and provided with a pair of radial blades normally disposed in generally horizontal planes and revolvable about a vertical axis; and adjustable interengaging means connecting said blades so that centrifugal force acting on either blade is counteracted by the centrifugal force applied to the other blade, said interengaging means including an eccentric element adjustable on each blade, said elements interlocking with their peripheries in contact.

2. In a helicopter: a body having a longitudinal axis of flight; a rotor connected with said body and provided with a pair of radial blades normally disposed in generally horizontal planes and revolvable about a vertical axis; and adjustable interengaging means connecting said blades so that centrifugal force acting on either blade is counteracted by the centrifugal force applied to the other blade, said interengaging means including an eccentric element on each blade, said elements interlocking with their peripheries in contact, and including adjusting means for adjusting said eccentrics angularly with respect to each other to move said blades toward and away from each other in a radial direction.

3. In a helicopter: a body having a longitudinal axis of flight; a rotor connected with said body and provided with radial blades normally disposed in generally horizontal planes and revolvable about a vertical axis with their longitudinal axes aligned and with their inner ends spaced apart; a pair of arms operatively connected to each blade at its inner end, said pairs of arms being disposed in crossing planes; a pin extending between said arms of each pair of arms; an eccentric element carried by each of said pins, said elements interlocking with their peripheries in contact so that centrifugal force acting upon either of said blades is counteracted by centrifugal force acting upon the other of said blades; and means for adjusting said eccentric elements angularly on said pins to vary the spacing between the inner ends of said blades.

4. The combination as defined in claim 3 in which the inner ends of said blades are secured within sleeves and said pairs of arms are integral with said sleeves.

5. The combination as defined in claim 3 in which said pins and said eccentric elements have interengaging fluted portions to adapt them for relative angular adjustment.

6. In a helicopter: a body having a longitudinal axis of flight; a rotor connected with said body and provided with radial blades normally disposed in generally horizontal planes and revolvable about a vertical axis with their longitudinal axes aligned and with their inner ends spaced apart; manually controlled means for tilting said blades to vary their pitch; a pair of arms operatively connected to each blade at its inner end, said pairs of arms being disposed in crossing planes; a pin extending between said arms of each pair of arms; an eccentric element carried by each of said pins, said elements interlocking with their peripheries in contact so that centrifugal force acting upon either of said blades is counteracted by centrifugal force acting upon the other of said blades; and means for adjusting said eccentric elements angularly on said pins to vary the spacing between the inner ends of said blades.

7. The combination as defined in claim 6 in which said eccentric elements consist of elongate cylinders so that the peripheries thereof remain in contact regardless of the relative angular disposition of said blades.

PAUL M. LEWIS.

REFERENCES CITED

The following references are of record in the file of this patent:

UNITED STATES PATENTS

| Number | Name | Date |
|---|---|---|
| D. 144,401 | Lewis | Apr. 9, 1946 |
| 1,622,138 | Ellerman | Mar. 22, 1927 |
| 1,783,011 | Florine | Nov. 25, 1930 |
| 1,844,786 | Nelson | Feb. 9, 1932 |
| 1,891,272 | Slonimsky | Dec. 20, 1932 |
| 1,892,036 | Campens | Dec. 27, 1932 |
| 1,951,817 | Blount | Mar. 20, 1934 |
| 1,987,650 | Wiegand | Jan. 15, 1935 |
| 2,030,953 | Gemeny | Feb. 18, 1936 |
| 2,146,367 | Berliner | Feb. 7, 1939 |
| 2,284,902 | Hosford | June 2, 1942 |
| 2,321,572 | Campbell | June 15, 1943 |
| 2,330,842 | Pullin | Oct. 5, 1943 |
| 2,405,488 | Briner | Aug. 6, 1946 |

FOREIGN PATENTS

| Number | Country | Date |
|---|---|---|
| 563,529 | France | Sept. 27, 1923 |
| 637,933 | France | Feb. 13, 1928 |
| 449,664 | Great Britain | July 1, 1936 |
| 525,809 | Great Britain | Sept. 4, 1940 |
| 580,008 | Great Britain | Aug. 23, 1946 |
| 99,775 | Sweden | Sept. 3, 1940 |